April 5, 1927.  1,623,728
G. B. HOOTON
OIL PURIFYING SYSTEM
Filed Aug. 13, 1925    2 Sheets-Sheet 1

Inventor
Gordon B. Hooton
by Charles Hall
Attys.

April 5, 1927.  
G. B. HOOTON  
OIL PURIFYING SYSTEM  
Filed Aug. 13, 1925
1,623,728.
2 Sheets-Sheet 2
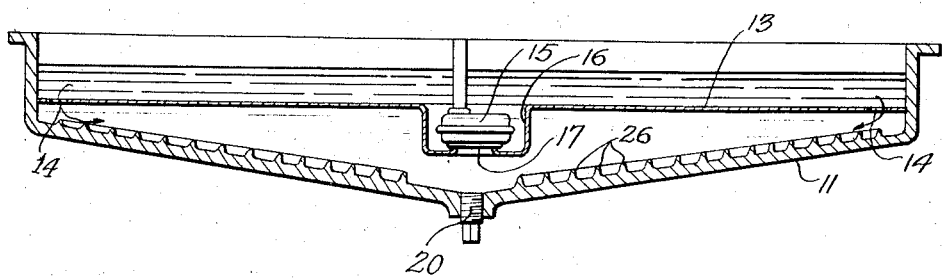
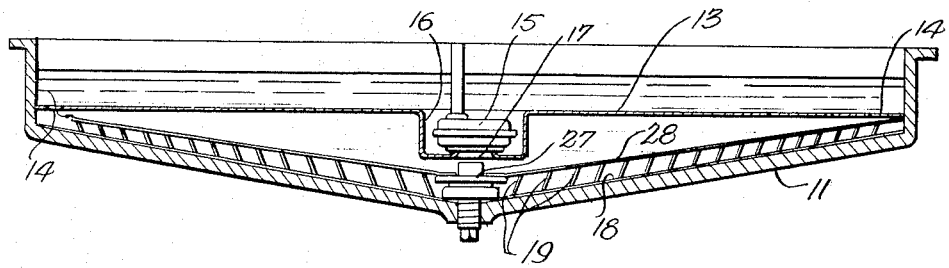
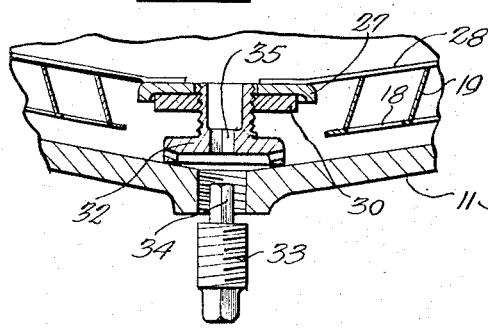 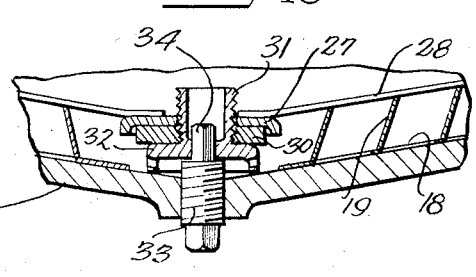
Inventor  
Gordon B. Hooton  
by Charles Hill  
Attys.

Patented Apr. 5, 1927.

1,623,728

UNITED STATES PATENT OFFICE.

GORDON B. HOOTON, OF GRAND RAPIDS, MICHIGAN.

OIL-PURIFYING SYSTEM.

Application filed August 13, 1925. Serial No. 50,087.

- This invention relates to oil purifying or settling means for removing sediment from lubricating systems especially such systems subjected to irregular vibration tending to stir up sediment already separated from the oil.

It is an object of this invention to provide a damper or baffle plate positioned horizontally at or below the normal low oil level and fitting close to the walls of the containing vessel such as the sump of an internal combustion engine which is subject to jostling or agitation, whereby agitation of the oil below the baffle plate is prevented.

It is also an object of this invention to provide a series of sediment traps adjacent the bottom of the reservoir below the baffle plate to retard or stop the oil flow along the bottom of the reservoir, thus preventing settled out impurities from being picked up again and carried along.

It is also another object of this invention to provide such sediment traps formed by interconnected members providing a unitary structure movable relative to the reservoir proper so that when it is desired to drain the reservoir the trap-forming members may be lifted or agitated to stir up the sediment which would thus be carried out by draining the oil.

It is a further object of this invention to provide means for elevating and agitating a series of sediment baffles actuated by the removal of a drain plug.

Other and further important objects of this invention will be apparent from the disclosures in the accompanying specification and drawings.

The invention—in a preferred form—is illustrated on the drawings and hereinafter more fully described.

On the drawings:

Figure 7 is a cross section of the sump of an engine embodying a modified form of the device of this invention wherein the sediment traps are formed as a part of the sump base.

Figure 8 is a section showing another modification of the device of this invention.

Figures 9 and 10 are similar enlarged fragmentary sections showing the method of operation of the agitating and cleaning mechanism of Figure 8.

As shown on the drawings:

Figure 1:
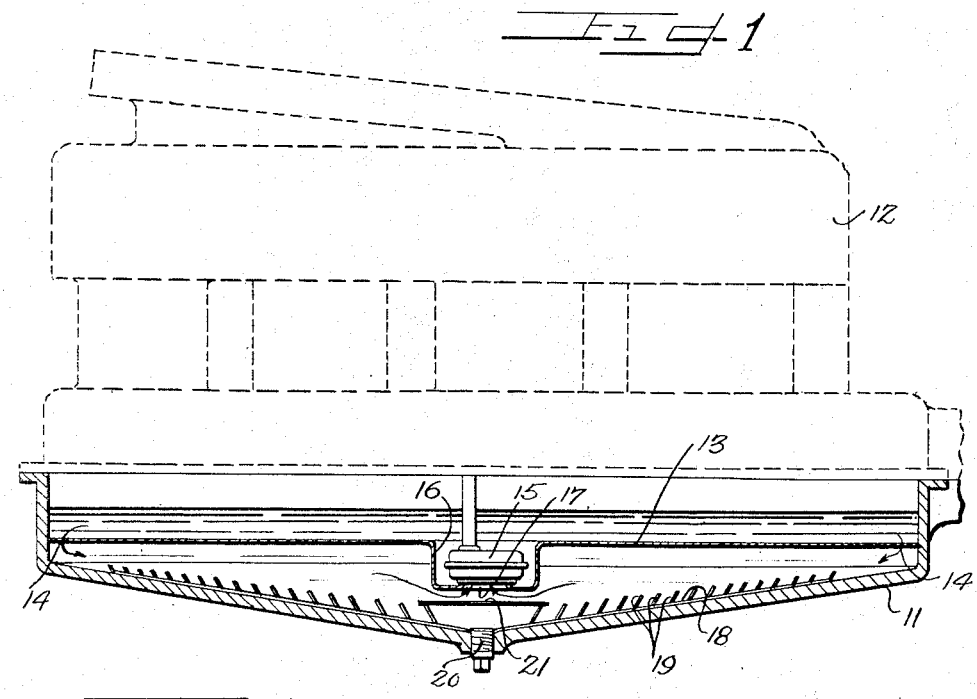
Figure 1 is a cross section of the sump of an internal combustion engine showing the preferred form of the device of this invention applied thereto.

An engine oil pan or sump 11 is indicated in connection with several of the modifications and is to be understood as being a conventional showing thereof in connection with the internal combustion engine 12 shown in dotted lines in Figure 1. In each modification it is intended to provide a submerged baffle plate 13 approximately horizontal and at or below the normal low level of the oil in the sump, the baffle being fitted closely to the walls of the sump and having small apertures 14 at either end to permit down flow of oil. The oil pump 15 is preferably set in a well 16 in the baffle plate and if necessary is sealed thereto in any suitable manner to insure drawing its supply of oil through the aperture 17. The purpose of the baffle plate is to prevent agitation of the oil below the baffle when the sump is subject to shocks or jostling as when used in a vehicle. By providing the holes 14 at the ends of the baffle the oil therebelow is forced to travel the longest possible distance to the pump intake thus giving ample time for the settling of impurities.

Figure 2:
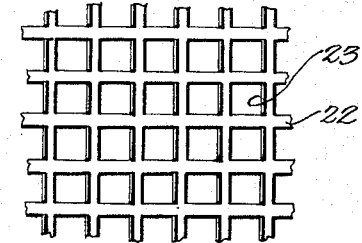
Figure 2 is an enlarged plan view of a fragment of one plate of the sediment trap therein.
Figure 3:
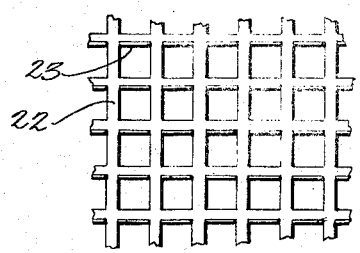
Figure 3 is a similar view of the second plate of the trap.
Figure 4:
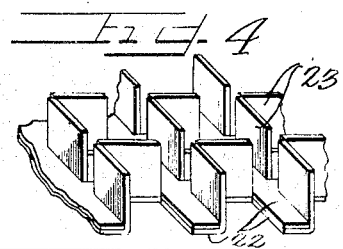
Figure 4 is a perspective view of the two plates in assembled relationship.

In the preferred form of Figure 1 sheet metal plates 18 having struck up lugs 19 are so arranged in a sump that a series of sediment traps are formed. These plates are simply laid in the sloping bottom of the sump, one on either side of the central drain 20, and the two are held in relationship by a central bridge 21 which also prevents the pump suction from drawing up a charge of sludge or mud from adjacent the drain outlet. Figures 2 and 4 illustrate a slight modification wherein superimposed plates 22 have lugs 23 struck up therefrom, the plates being so assembled that the lugs form sediment traps as shown in Figure 4.

Figure 5:
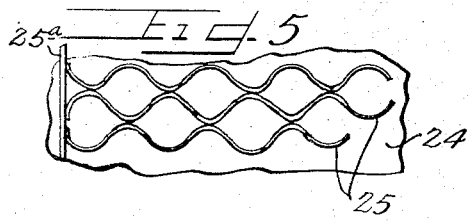
Figure 5 is a plan view and Figure 6 an elevational view of a fragmentary portion of a modified form of oil trap.
Figure 6:
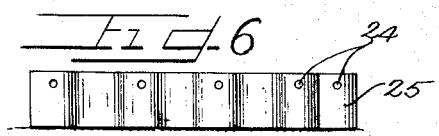

The modification of Figures 5 and 6 relates only to the form of sediment traps which in this case comprises vertically arranged corrugated strips 25 mounted side by side to provide a series of vertical cells therebetween. Perforations 24 in the strips 25 permit a slow oil flow along the series of cells. The strips 25 are affixed at the ends to connecting plates 25^A. Figure 7 illustrates transverse and longitudinal ridges 26 cast in the bottom of the sump and serving as traps. This structure is the simplest and least expensive, but the most difficult to periodically clean out.

Figures 8 and 10 relate to means for raising and agitating inserted sediment traps, such as have been described hereinbefore, and it is to be understood that this mechanism is applicable to all of the modifications shown with the exception of integral traps of Figure 7. In this modification the plate lugs 19 of Figure 1 are tied together and to a central cross bar 27 similar to the bridge 21, by longitudinal rods 28, the bar 27 having a central aperture 29 and a nut 30 positioned therebelow and affixed thereto on the threaded stem 31 of an eccentric stub shaft 32 surrounding the drain plug 33, having a polygonal top 34 fitting a similar opening 35 in the shaft. Either the top 34 is eccentric to the drain plug axis or the opening 35 is eccentric to the stub shaft axis to provide an oscillating and elevating action when the drain plug is rotated to withdraw the same, as shown in Figures 9 and 10. Elevating the sediment traps allows the flow of the collected sediment towards the drain, and the agitation of the traps during the elevation thereof serves to stir up the sediment so that it will be carried out by drainage of the oil thus avoiding the necessity of opening up the sump to permit cleaning out of the accumulated sediment.

The operation of this device as an oil purifier depends upon maintaining a fairly large proportion of the oil undisturbed by external shocks and movement by means of a baffle plate below the normal low fluid level and in causing this divided volume of oil to flow slowly over a series of sediment traps on its way to the pump suction, the slow flow quiet conditions and long path provided all assisting in separating foreign matter from the oil. It will be evident that such an oil clarifier cannot possibly become clogged even though the sediment traps become completely filled.

In order to provide simple means for automatically stirring up accumulated sediment when it is desired to drain off the old oil the drain plug may be equipped to oscillate and elevate the sediment traps so that the whole sump may be efficiently cleaned by the simple act of removal of the drain plug.

I am aware that numerous details of construction may be varied through a wide range without departing from the principles of this invention, and I therefore do not purpose limiting the patent granted otherwise than necessitated by the prior art.

I claim as my invention:

1. In a lubricating system of the class described a baffle plate positioned in the reservoir below the normal fluid level therein, a pump positioned in a recess in said plate and drawing fluid from below said plate, said plate having restricted fluid passages therethrough positioned at a distance from the pump intake, and sediment traps arranged in the bottom of said reservoir in the path of fluid flow from said fluid passages to said pump intake.

2. In a lubricating system of the class described a baffle plate positioned in the reservoir below the normal fluid level therein, a pump drawing fluid from below said plate, said plate having restricted fluid passages therethrough positioned at a distance from the pump intake, sediment traps arranged in the bottom of said reservoir in the path of fluid flow from said fluid passages to said pump intake, and means for agitating said plates to stir up the accumulated sediment when it is desired to drain said reservoir.

3. In an oil sump, a series of interconnected members forming sediment traps adjacent the bottom of the sump, means adapted to cause the oil to flow over said sediment traps, a drain for said sump, and means associated with said drain adapted to agitate said members forming sediment traps whereby the settled sediment will be stirred up upon the opening of said drain.

4. In an oil reservoir, members forming a series of sediment pockets, a central bridge connecting said members and having an aperture therethrough, a drain opening in said reservoir aligned with said aperture, an eccentric stub shaft positioned above said drain opening and engaging within the bridge aperture, a plug for said drain opening and means associated with said plug adapted to rotate said eccentric stub shaft upon removal thereof.

5. In an oil reservoir, members forming a series of sediment pockets, a central bridge connecting said members and having an aperture therethrough, a drain opening in said reservoir aligned with said aperture, an eccentric stub shaft positioned above said drain opening and engaging within the bridge aperture, a plug for said drain opening, means associated with said plug adapted to rotate said eccentric stub shaft upon removal thereof, and means associated with said stub shaft adapted to simultaneously elevate said bridge upon rotation of said shaft whereby said bridge is elevated and oscillated upon the removal of said drain plug.

In testimony whereof I have hereunto subscribed my name.

GORDON B. HOOTON.